United States Patent [19]
Haferl

[11] Patent Number: 4,565,949
[45] Date of Patent: Jan. 21, 1986

[54] TELEVISION RASTER DISTORTION CORRECTION CIRCUIT

[75] Inventor: Peter E. Haferl, Adliswil, Switzerland

[73] Assignee: RCA Corporation, Princeton, N.J.

[21] Appl. No.: 672,955

[22] Filed: Nov. 19, 1984

[30] Foreign Application Priority Data

Nov. 25, 1983 [GB] United Kingdom ................ 8331573
Feb. 29, 1984 [GB] United Kingdom ................ 8405317

[51] Int. Cl.$^4$ .......................................... H01K 29/56
[52] U.S. Cl. ................................................. 315/371
[58] Field of Search ........................ 315/370, 371, 399

[56] References Cited

U.S. PATENT DOCUMENTS

| | | |
|---|---|---|
| 4,088,931 | 5/1978 | Haferl . |
| 4,140,949 | 2/1979 | Terry . |
| 4,206,388 | 6/1980 | Ishigaki et al. ..................... 315/371 |
| 4,242,714 | 12/1980 | Yoshida et al. . |

OTHER PUBLICATIONS

A report, Electronic Application Laboratory Report, by group C.A.B., entitled, A New Design of a Diode Modulator for East-West Raster Correction in CTV Receivers, by A. H. Nillesen, dated Apr. 17, 1973.
Schematic p. 82 of a Japanese TV Schematic Book dated Sep. 1983.

*Primary Examiner*—Theodore M. Blum
*Attorney, Agent, or Firm*—Eugene M. Whitacre; Joseph J. Laks; Sammy S. Henig

[57] ABSTRACT

An inside-outside pincushion correction circuit includes an arrangement of first and second branches that provide a pair of current paths to a deflection current that flows in a deflection winding. The first branch includes a modulation inductance and the second branch includes a modulation capacitance that is coupled across the modulation inductance by a switch at a controllable time during the retrace interval. The controllable time varies in a vertical rate parabolic manner to provide deflection current modulation to correct inside and outside pincushion distortions. Variation of the retrace interval associated with the modulation inductance are compensated by offsetting variations produced by the retrace capacitance.

17 Claims, 28 Drawing Figures

TELEVISION RASTER DISTORTION CORRECTION CIRCUIT

This invention relates to television raster distortion correction circuitry such as pincushion correction circuitry.

It is known in the art that side or East-West pincushion distortion of the raster on a kinescope such as utilized in a television receiver may be substantially eliminated by modulating the horizontal rate deflection current amplitude through the horizontal deflection winding by a substantially parabolic current component at a vertical scanning rate.

In some deflection circuits the deflection winding has such characteristics that pincushion correction circuitry is required for correcting pincushion distortion. Some prior art circuits for correcting such pincushion distortions exhibit undesirable retrace and trace interval modulation as a function of the vertical position of the scan line. The retrace or trace time modulation causes in some prior art circuits high voltage modulation that disturbs picture width and focus. The circuit embodying the invention reduces the above types of high voltage modulation.

In accordance with an aspect of the invention, a first switch applies a retrace voltage at a terminal that is coupled to a deflection winding. A raster distortion correction circuit embodying the invention is coupled to the deflection winding. The raster distortion correction circuit contains an impedance having two branches. The first of which forms a first current path of a deflection current that flows through the deflection winding. The first current path is coupled to the deflection winding by a controllable switch. The second branch forms a second current path of the deflection current. The controllable switch modulates the deflection current in the deflection winding by modulating the impedance in accordance with a modulation rate voltage in a manner to reduce raster distortions. A retrace voltage is developed at a terminal of a first switch. A portion of the retrace voltage is developed across a retrace capacitor that generates a retrace scanning current in the deflection winding. The amplitude of the voltage across the retrace capacitor relative to that of the retrace voltage is modulated in accordance with the deflection current flowing through the first current path.

In accordance with another aspect of the invention, a deflection winding is coupled to a first switch for generating a trace current in the deflection winding during a trace interval. A first retrace capacitance is coupled to the deflection winding. A modulation inductance is coupled to the deflection winding and to a second retrace capacitance in such a way that the modulation inductance, deflection winding, first and second retrace capacitances form a bridge circuit. A source of raster distortion correcting modulation rate voltage is coupled to a second switch that is responsive to the modulation rate voltage, for providing at a terminal of the bridge circuit, an impedance path that is low at the retrace frequency, during a first portion of the retrace interval.

Figure 1:
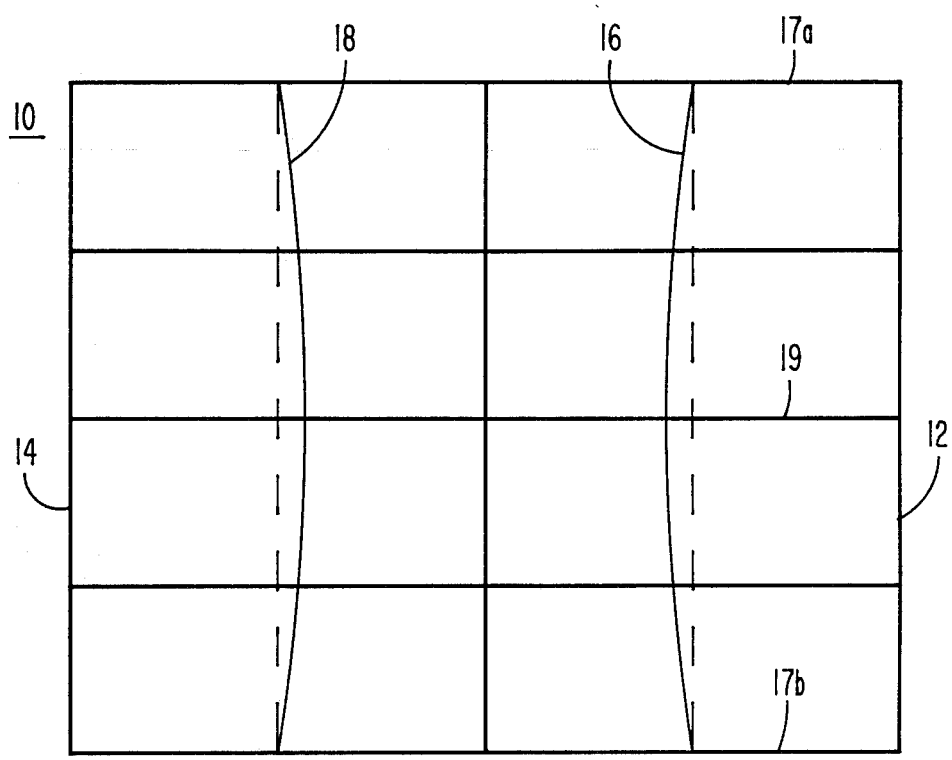
FIG. 1 is a depiction of a television raster showing inside pincushion distortion.

FIG. 1 illustrates inside pincushion distortion as it appears on a television raster displaying a crosshatch line pattern indicated generally by 10. The right and left sides of the crosshatch pattern are defined by vertical lines 12 and 14. Lines 12 and 14 are straight, indicating that the raster is East-West outside pincushion corrected in a manner described later on. Vertical grid lines 16 and 18 lying between the center and the sides of the raster are curved, as indicated by their departure from the straight dotted lines, indicate the presence of inside pincushion distortions. Horizontal lines 17a and 17b illustrate the horizontal scanning position for a top or a bottom raster scanning example; whereas horizontal line 19 illustrates the horizontal scanning position for a center raster scanning example.

Figure 2:
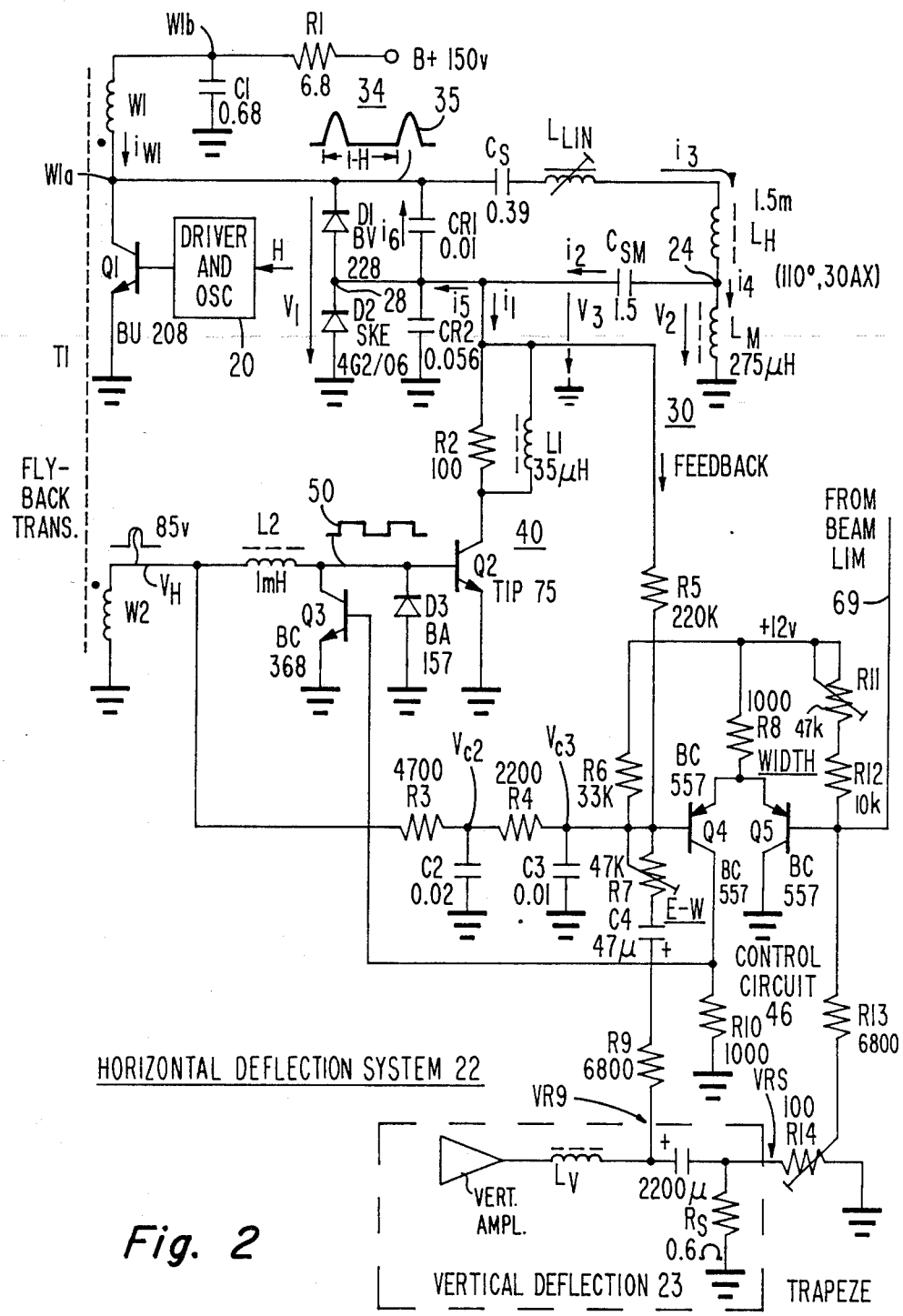
FIG. 2 illustrates a television receiver deflection system that includes a pincushion correction circuit embodying an aspect of the invention.

FIG. 2 illustrates a horizontal deflection system 22 of a television receiver, embodying the invention. A driver and oscillator unit 20 receives a synchronizing signal H from a synchronizing signal separator, not shown in FIG. 2, that separates horizontal synchronizing signals from the composite video signal obtained from, for example, a video detector, also not shown in FIG. 2.

Driver and oscillator unit 20 causes a transistor switch Q1 to close prior to the center of the horizontal trace interval and to open, for initiating the retrace interval, at the end of the horizontal trace interval. The collector of transistor switch Q1 is coupled to one end terminal W1a of a primary winding W1 of a flyback transformer T1. The other end terminal W1b is coupled to a filter capacitor C1 and to an energizing voltage B+ through a resistor R1. Horizontal deflection system 22 produces a generally sawtooth current through a horizontal deflection winding $L_H$. "S" shaping of the horizontal deflection current $i_3$ is produced, in part, by a trace capacitor $C_s$ having one plate that is coupled to terminal W1a of transformer winding W1. Energy losses are replenished from voltage B+ through transformer winding W1, during retrace. The other plate of capacitor $C_s$ is coupled to the series arrangement of a linearity inductor $L_{LIN}$, deflection winding $L_H$ and a modulation inductor $L_M$. One plate of a first retrace capacitor CR1 is coupled to terminal W1a of transformer winding W1. The other plate of capacitor CR1 is serially coupled to a plate of a second retrace capacitor CR2 having its other plate coupled to a reference potential. A damper diode D1, coupled across the plates of retrace capacitor CR1, is poled to conduct current from a junction terminal 28, between the respective plates of capacitors CR1 and CR2, to terminal W1a of winding W1. Similarly, a damper diode D2, coupled across the plates of retrace capacitor CR2, is poled to conduct current from the reference potential to junction terminal 28.

Figure 3:
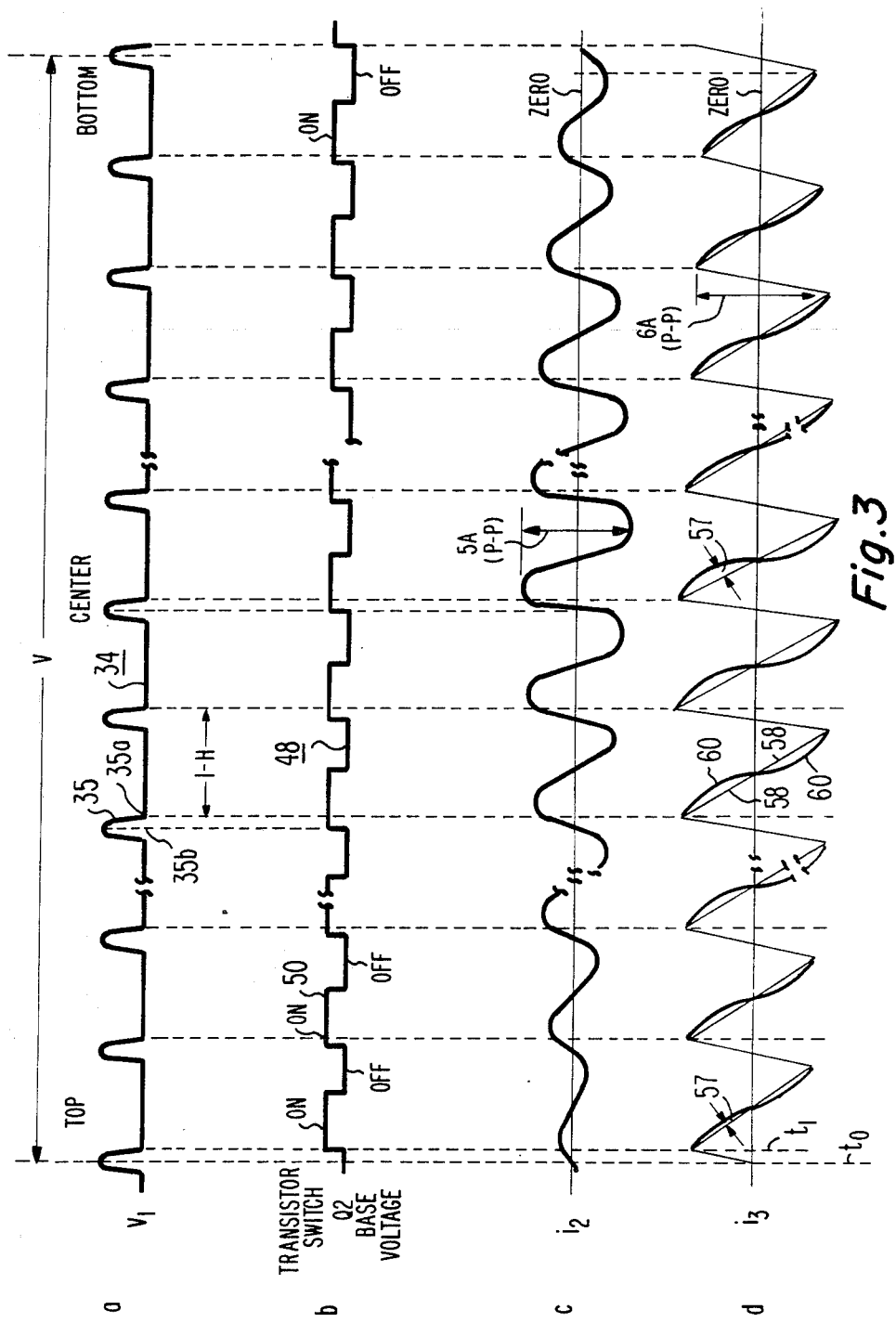
FIGS. 3a-3d illustrate idealized waveforms useful for explaining the operation of the pincushion correction circuit of FIG. 2.

FIG. 3a illustrates a horizontal scanning rate voltage waveform 34 having retrace pulses 35 that may represent voltage $V_1$, for example, at terminal W1a of FIG. 2. Diodes D1 and D2 clamp the voltage at terminal W1a to approximately the reference potential during the first half of the trace interval; whereas, transistor switch Q1 clamps it to approximately the reference potential during the second half of the trace interval.

In accordance with an inventive aspect, an inside-outside pincushion correction circuit 30, that includes inductor $L_M$, is coupled to a junction terminal 24, between modulation inductor $L_M$ and deflection winding $L_H$. Circuit 30 includes a modulation capacitor $C_{SM}$ having one plate that is coupled to terminal 24 to form a first branch. Inductor $L_M$ forms a second branch of circuit 30. The other plate of capacitor $C_{SM}$ is coupled to a controllable switch 40 and to junction terminal 28 that is coupled to the respective plates of capacitors CR1 and CR2. Controllable switch 40 includes a parallel arrangement of an inductor L1 and a resistor R2 interposed between terminal 28 and a transistor switch Q2 that couples, when closed, junction 28 through inductor L1 and resistor R2 to the reference potential. Controllable switch 40 is controlled by an East-West control circuit 46 that supplies the base voltage of transistor switch Q2.

Figure 6:
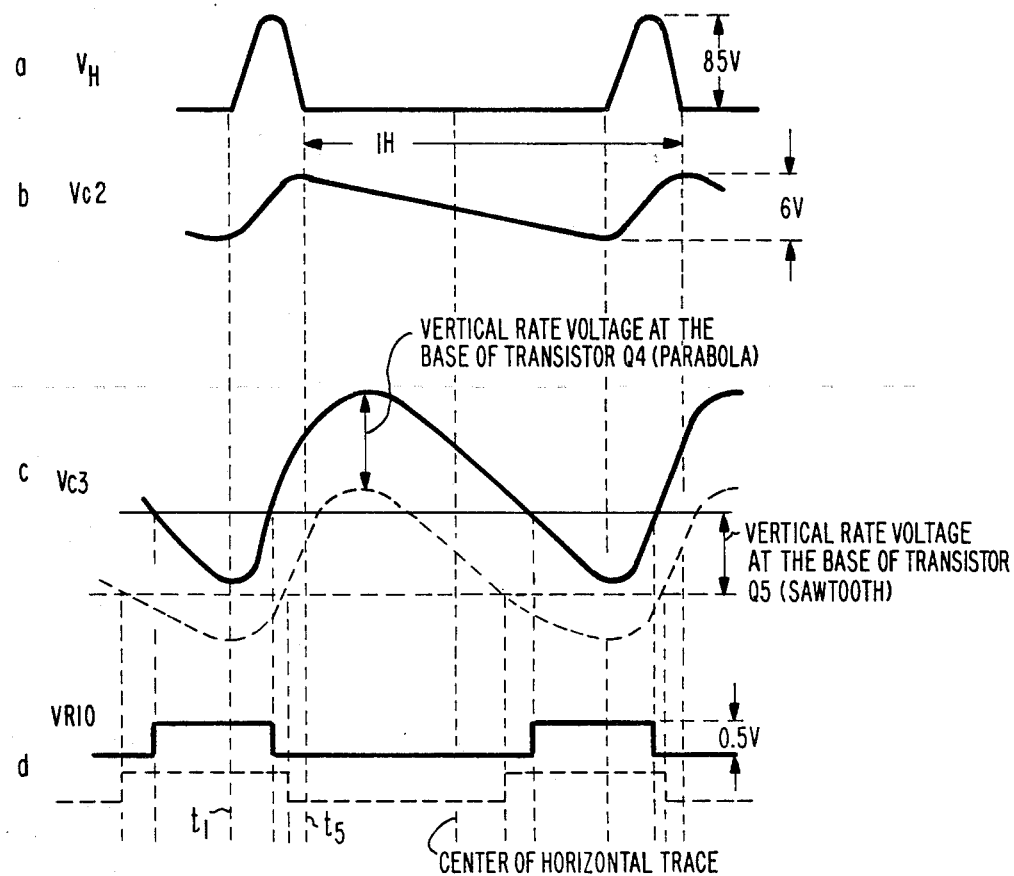
FIGS. 6a-6d illustrate waveforms useful in explaining operation of the control circuit of the circuit of FIG. 2.

Control circuit 46 is coupled to an output terminal of horizontal flyback transformer T1 for receiving a synchronizing information signal $V_H$ at the horizontal deflection rate. The waveform of signal $V_H$ is illustrated in FIG. 6a. Such information is in the form of periodic horizontal retrace pulses similar to that of waveform 34 of FIG. 3a. Signal $V_H$ is coupled to the base of transistor Q4 through a double integration network that includes resistors R3 and R4 and capacitors C2 and C3. FIGS. 6b and 6c illustrate the waveforms of voltages Vc2 and Vc3, respectively, across capacitors C2 and C3, respectively. The solid line is associated with the center raster scanning example; whereas the broken line is associated with the top or bottom raster scanning example.

Figure 7:
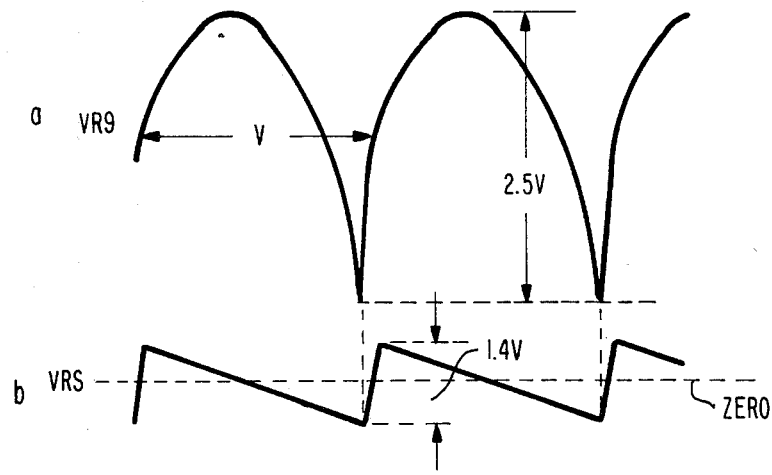
FIGS. 7a-7b illustrate additional waveforms useful in explaining operation of the control circuit of the circuit of FIG. 2.

Control circuit 46 is also coupled to an output terminal of a vertical deflection generator 23 for receiving a vertical rate signal VR9. FIG. 7a illustrates the waveform of signal VR9. Signal VR9 is coupled to the base of transistor Q4 through a series arrangement of resistors R7 and R9 and a capacitor C4. A signal VRS of vertical deflection generator 23 is coupled through variable resistor R14 and a resistor R13 to the base of a transistor Q5 to provide trapeze correction. FIG. 7b illustrates the waveform of signal VRS.

Transistors Q4 and Q5 are coupled as a common emitter differential pair. As a result of signals VR9, VRS and $V_H$, transistor Q4 is turned off at the horizontal rate but at instants that very in a vertical rate parabolic manner.

Figure 4:
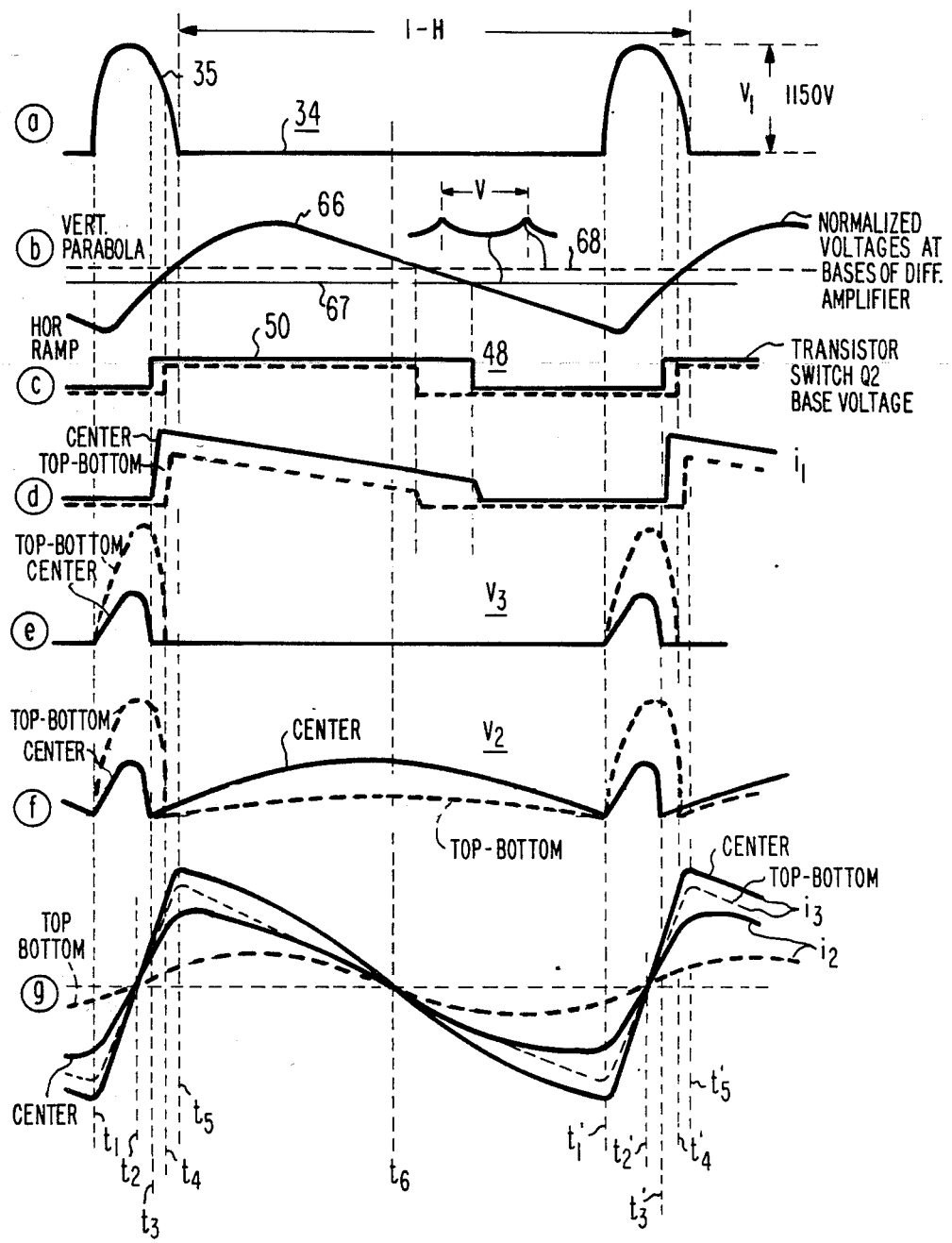
FIGS. 4a-4g illustrate additional waveforms useful for explaining operation of the pincushion correction circuit of FIG. 2.

FIG. 4b illustrates a horizontal ramp waveform 66 that represents the contribution of signal $V_H$ to the voltage at the base of transistor Q4. The level, solid line 67, represents a normalized switching threshold voltage of transistor pair Q4 and Q5 for the center raster scanning example. Likewise, the level, broken line 68, represents a normalized threshold voltage of transistors pair Q4 and Q5, for the top or bottom scanning example. At time $t_3$ or $t_4$, in the respective example, ramp waveform 66 turns on transistor switch Q2, as illustrated in FIG. 4c.

FIG. 6d illustrates the waveform of a signal VR10 across a resistor R10 that is series coupled with the collector of transistor Q4. The collector of transistor Q4 is coupled to the base of a transistor Q3. The collector of transistor Q3 is coupled between the base of transistor switch Q2 and the reference potential. Additionally, signal $V_H$ is coupled to the base of transistor switch Q2 through an inductor L2 and across a diode D3. Signals $V_H$ and VR10 form repetitive sequence 48 of FIG. 4c or 3b at the base of transistor switch Q2.

An input 69 of control circuit 46 of FIG. 2 indicates where picture width variations caused by beam current may be compensated. Transistor switch Q2 can be replaced by a power FET. This may eliminate the need for inductor L2, transistor Q3 and diode D3.

FIGS. 3a and b illustrate schematically approximated waveforms of voltage $V_1$ that may appear at terminal W1a and repetitive sequence 48 that may appear at the base of transistor switch Q2, respectively. The left and right sides of the respective waveform corresponds to the top or bottom of the raster, respectively. Similar numbers in FIGS. 2, 3a and 3b indicate similar items or functions.

Each pulse of pulses 50 of FIG. 3b that drives the base of transistor switch Q2 of FIG. 2 has a leading or positive-going edge that occurs during the second half of the corresponding retrace pulse 35 of FIG. 3a. The trailing edges of individual pulses 50 of pulse sequence 48 of FIG. 3b occur after the center of the trace interval.

At the beginning of each repetitive sequence 48, corresponding to the top of the vertical scan, the leading edge of each of pulses 50 occurs close to the termination time 35a of each retrace pulse 35 of waveform 34 FIG. 3a. Thus, pulses 50 of FIG. 3b cause transistor switch Q2 of FIG. 2 to be in its on-state for only a relatively short time during the corresponding retrace pulse 35 of FIG. 3a. Pulses 50 of FIG. 3b occurring after the beginning of vertical scan but before center of vertical scan have leading edges which are progressively advanced toward the center points 35b of retrace pulses 35 of FIG. 3a. At the center of vertical scan, as illustrated in FIG. 3b, the leading edge of individual pulses 50 are near the center points 35b of retrace pulses 35 of FIG. 3a.

From the center of sequence 48 of FIG. 3b to the end of each sequence, which correspond to the middle and bottom, respectively, of the vertical scan, the leading edges of the pulses 50 are progressively retarded further from corresponding center of retrace point 35b of FIG. 3a, for example. At the bottom of vertical scan maximum retardation of the leading edge occurs, causing the duration of the portion of pulse 50 that overlaps the corresponding retrace pulse 35 of FIG. 3a to be short again. Thus, the time in which switch Q2 of FIG. 2 is on, during the retrace interval, progressively increases in duration from the beginning to the middle of a vertical scan, and progressively diminishes in duration from the middle to the end of a vertical scan.

Pincushion correction circuit 30 comprises a switch-variable impedance coupled in series with deflection winding $L_H$. When transistor switch Q2 is off, pincushion correction circuit 30 substantially presents high inductive impedance in the form of modulation inductor $L_M$ in the current path formed by deflection winding $L_H$. During the horizontal retrace interval, when transistor switch Q2 is on, circuit 30 presents a low capacitive impedance of capacitor $C_{SM}$ in the deflection current path of deflection winding $L_H$. This arrangement corrects for both inside and outside pincushion distortion. The functions of capacitor $C_{SM}$ and inductor $L_M$ of pincushion correction circuit 30 are described in detail in U.S. Pat. No. 4,088,931 in the name of P. E. Haferl, issued on May 9, 1978, entitled PINCUSHION CORRECTION CIRCUIT, referred to later on as the Haferl patent and incorporated herein by reference.

FIGS. 4a–4g and 5a–5f illustrate approximated waveforms useful in explaining the operation of deflection system 22 of FIG. 2; likewise, FIGS. 5a–5f illustrate typical waveforms of deflection system 22 of FIG. 2. Identical numbers and symbols in FIGS. 2, 4a–4g and 5a–5f indicate similar items or functions. A waveform illustrated in a broken line indicates that the waveform is illustrated for an example in which scanning takes place at the top or bottom of the raster. Likewise, a waveform illustrated in a solid line indicates that the waveform is illustrated for an example in which scanning takes place at the center of the raster.

As illustrated in FIG. 4c, transistor switch Q2 of FIG. 2 is turned on earlier during the retrace interval in the center screen scanning example than in the top or bottom screen scanning example. The earlier turn on time of transistor switch Q2 in this example, causes that the impedance of pincushion correction circuit 30 is lower during the period t3 to t4 of FIG. 4c than in the top or bottom screen scanning example. This is so because transistor switch Q2 of FIG. 2 couples capacitor $C_{SM}$ substantially in parallel to inductor $L_M$. Thus, it can be understood that the average or effective inductance during retrace that is coupled with deflection winding $L_H$ by pincushion correction circuit 30 at the top and at the bottom of the raster is higher than at the center because transistor switch Q2 is closed during the retrace interval relatively late, as described before. Therefore, the peak deflection current $i_3$ flowing in deflection winding $L_H$ at the end of retrace is lower. This results in reduced horizontal beam deflection at the top and at the bottom of the raster, that provides outside pincushion distortion correction. Because switch 40 closes relatively late, at the top and bottom trace scanning example, modulation voltage $V_2$ of FIG. 4f across inductor $L_M$ of FIG. 2 during the retrace interval is higher, current $i_4$ of FIG. 5a in inductor $L_M$ of FIG. 2 is higher, current $i_2$ of FIG. 5c or 4g in capacitor $C_{SM}$ of FIG. 2 is lower and current $i_3$ of FIG. 5b or 4g in deflection winding $L_H$ of FIG. 2 is also lower, than in the center of vertical trace scanning example.

FIGS. 3c and d illustrate, approximated waveforms of currents $i_2$ and $i_3$, respectively. As illustrated in FIG. 3c, current $i_2$ that flows in the branch containing capacitor $C_{SM}$ of FIG. 2 is higher at the center of the raster, for example, than at the top or the bottom.

Figure 5:
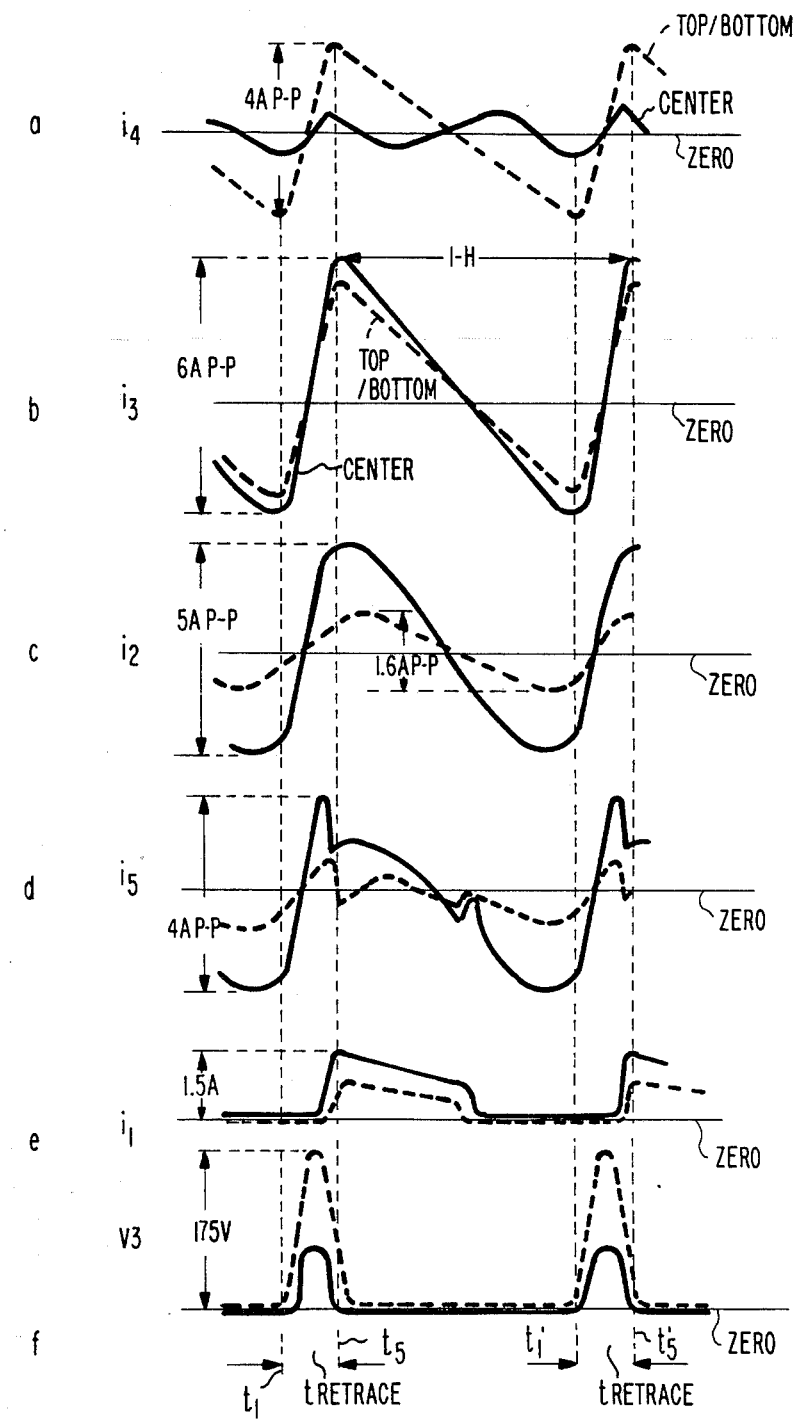
FIGS. 5a-5f illustrate still additional waveforms useful for explaining operation of the pincushion correction circuit of FIG. 2.

FIGS. 5e and c illustrate typical waveforms of currents $i_1$ and $i_2$, respectively. Current $i_1$ of FIG. 5e, flowing through controllable switch 40 of FIG. 2, begins to flow soon after transistor switch Q2 closes. It stops flowing when transistor switch Q2 opens at approximately the center point of a given trace interval. The charge carried by current $i_1$ during the retrace interval is the actual drive current of the east-west modulation.

Current $i_2$ of FIG. 5c in capacitor $C_{SM}$ of FIG. 2 that is negative at the beginning of retrace, increases positively during the horizontal retrace inteval. Current $i_2$ becomes more positive, during the second half, of the horizontal retrace interval, at the center of the raster than at the top and at the bottom of the raster, as can be seen in FIG. 3c.

Due to the coupling between deflection current $i_3$ and capacitor $C_{SM}$ current $i_2$, deflection current $i_3$ and capacitor current $i_2$ increase and decrease in consonance during the trace interval as illustrated in FIGS. 3d and c, respectively. The relative magnitudes of currents $i_3$ and $i_2$ during trace are determined by the closing time of switch 40 of FIG. 2 during retrace. Capacitor current $i_2$ of FIG. 5c decreases to zero at the center of the horizontal trace interval and begins to increase in the negative direction during the second half of the horizontal trace interval. During the second half of the horizontal trace interval, diode D2 of FIG. 2 conducts current $i_2$ and transistor switch Q2, as explained before, is opened.

Capacitor $C_{SM}$ is in series with current $i_2$, a portion of deflection current $i_3$, during the entire trace interval. Capacitor $C_{SM}$ causes voltage $V_2$, during the interval $t_5$ to $t_1'$ of FIG. 4f, to provide additional S correction. Voltage $V_2$ of FIG. 4f across inductor $L_M$ of FIG. 2 is combined in series with the voltage across trace capacitor $C_S$ to vary the waveform of deflection trace current $i_3$ to provide inside pincushion correction. The amount of additional S correction of deflection current $i_3$ provided by capacitor $C_{SM}$ depends upon the proportion of capacitor $C_{SM}$ current $i_2$ relative to deflection current $i_3$. At the top and at the bottom of the raster, capacitor current $i_2$ is relatively small because of relatively late closing of switch 40. Consequently, at the top and at the bottom of the raster, capacitor $C_{SM}$ provides less additional S correction of deflection current $i_3$ than at the center of the raster, where early closing of switch 40 allows greater current flow in capacitor $C_{SM}$. Thus, switch 40 provides variation in S correction as a function of the vertical scan, as shown by the progressive deviation distance 57 of waveforms 60 of deflection current $i_3$ of FIG. 3d from a corresponding straight lines 58, as a function of the vertical position of the scan lines.

Adjustment of the size of capacitor $C_{SM}$ of FIG. 2 determines the nature of the S correction provided, because capacitor $C_{SM}$ and modulation inductor $L_M$ form a trace resonance circuit. When capacitor $C_{SM}$ is adjusted to a value that makes capacitor current $i_2$ of substantially the same frequency as deflection current $i_3$, pincushion correction circuit 30 modulates only the amplitude of deflection current $i_3$, resulting in only outside pincushion distortion correction. On the other hand, when capacitor $C_{SM}$ is adjusted to a smaller value, so that capacitor current $i_2$ contains significant higher frequency components than deflection current $i_3$, as illustrated in FIG. 3c and 3d, outside as well as inside pincushion distortion correction is provided. A smaller value of capacitor $C_{SM}$ results in a higher parabolic voltage amplitude and in more additional S-shaping.

Just prior to time $t_1$ or $t_1'$ of FIGS. 4a–4g and 5a–5f, the beginning of the retrace interval, current $i_4$ of FIG. 2 in modulation inductor $L_M$, deflection current $i_3$, current $i_2$ through capacitor $C_{SM}$, illustrated in FIGS. 5a, b and c, respectively, are all negative; whereas, current $i_1$ of FIGS. 4d through switch 40 of FIG. 2 is zero because switch 40 of FIG. 2 is open. Therefore, current $i_5$ of FIG. 5d flowing to terminal 28 is negative and equal at that time to current $i_2$.

At time $t_1$ or $t_1'$ of FIGS. 4a–4g and 5a–5f, transistor switch Q1 of FIG. 2 opens. Current $i_{W1}$ in transformer winding W1 and current $i_3$ in deflection winding $L_H$ charge the series arrangement of retrace capacitors CR1 and CR2 obtain the retrace pulse voltage 35 of FIGS. 3a and 4a at the collector of horizontal output transistor Q1.

In accordance with an inventive feature, during the retrace interval, when transistor switch Q2 is not conducting, inductor $L_M$, retrace capacitor CR2, deflection winding $L_H$ and retrace capacitor CR1 form first, second, third and fourth branches, respectively, of a bridge circuit. The bridge condition is such that the ratio of values between capacitors CR1 and CR2 equals the ratio of values between the inductance of inductor $L_M$ and that of deflection winding $L_H$. During retrace, retrace capacitor CR1 and deflection winding $L_H$ form a first retrace resonant circuit. Similarly, retrace capacitor CR2 and modulation inductance $L_M$ form a second retrace resonant circuit, that resonates at substantially the same frequency as that of the first retrace resonant circuit. Each of the two resonant circuits where each is formed of two pairs, of branches of the bridge circuit, includes capacitor $C_{SM}$ that forms the central bridge branch of the bridge circuit. When transistor switch Q2 is not conducting, the voltages at bridge junction terminals 28 and 24 are substantially equal and current $i_2$ is minimum. In constrast, the circuit described in the Haferl patent for inside and outside pincushion distortion correction shows no bridge configuration during retrace and tends to produce, therefore, retrace time modulation.

After transistor switch Q2 is turned on at a controlled instant in the second half of retrace, the short circuit across retrace capacitor CR2 caused by transistor switch Q2 being on, has a relatively small influence on the retrace frequency because inductor $L_M$ is simultaneously shunted due to the high capacitance of capacitor $C_{SM}$. Thus, transistor switch Q2 forms a short circuit across the second resonant circuit of the bridge configuration. Transistor switch Q2 does not substantially affect the resonance frequency of the first retrace resonant circuit that includes retrace capacitor CR1 and deflection winding $L_H$. Therefore, retrace time modulation does not appear.

At time $t_2$ or $t_2'$, at point 35b of pulse 35 of FIG. 3a, the center of the retrace interval, each of currents $i_4$, $i_3$, $i_2$ and $i_5$ of FIGS. 5a, b, c and d, attains zero level just before reversing polarity. At time $t_2$, the total of the circulating energy is stored in the series arrangement of retrace capacitors CR1 and CR2. Transistor switch Q2 modulates the voltage across capacitor CR2, which is equal to voltage $V_2$ across inductor $L_M$ in accordance with the vertical rate voltage of vertical deflection circuit 23. The voltage across capacitor CR1 is therefore modulated by transistor switch Q2, taking into account that the voltage $V_1$ remains unmodulated. Also, the voltage amplitude across retrace capacitor CR2 varies inversely to the variation in the amplitude of the voltage across retrace capacitor CR1. Thus, the circulating energy is also modulated.

During the interval $t_3$–$t_4$, when transistor switch Q2 is on, capacitor $C_{SM}$ bypasses inductor $L_M$, and causes that current $i_4$ decreases and current $i_2$ increases. The modulated energy stored in capacitors CR1 and CR2 is transferred to the inductance of deflection winding $L_H$ and inductor $L_M$ during the interval $t_2$–$t_5$ of FIGS. 5a–f and determines the amplitude of deflection current $i_3$ at time $t_5$, the beginning of the trace interval.

The bypassing of inductor $L_M$ by capacitor $C_{SM}$ and transistor switch Q2 causes modulation of the total inductance. If, for example, more capacitor $C_{SM}$ current $i_2$ is bypassed, then less current $i_4$ flow through inductor $L_M$ and the total inductance appears to be smaller. This smaller inductance causes higher deflection current $i_3$. Thus, for example, when the turn on time of transistor switch Q2 is shifted from time $t_3$ to time $t_4$ of FIG. 4c, the stored energy in retrace capacitors CR1 and CR2 decreases and the apparent inductance of inductor $L_M$ increases, both effects causing a decrease in deflection current $i_3$.

Current $i_5$ of FIG. 5d at time $t_1$, in the center of vertical trace raster scanning example, is more negative than in the top/bottom scanning example. Therefore, capacitor CR2 is charged, in the center scanning example, during the retrace interval, to a lower portion of retrace voltage $V_1$ of FIG. 4a than in the top/bottom scanning example.

At time $t_3$ of FIG. 4c, in the case of the center raster scanning example, or at the later time $t_4$ in the case of the top/bottom raster scanning example, transistor switch Q2 closes and current $i_1$ of FIG. 4d flows through controllable switch 40, as also illustrated by the respective waveforms of FIG. 5e. Inductor L1 of switch 40 of FIG. 2 serves as a current limiter and also as an intermediate energy storage device. With current $i_1$ diverted from terminal 28 through switch 40, current $i_5$, flowing to terminal 28, is lower than current $i_2$.

Because of the earlier closing of switch 40 in the center of vertical trace raster scanning example, current $i_5$ of FIG. 2 becomes lower at an earlier time than in the top/bottom scanning example. The discharging current of capacitor CR2, which is equal to current $i_6$ through capacitor CR1 less current $i_5$, discharges capacitor CR2 and causes voltage $V_3$ across capacitor CR2 having a waveform as illustrated in FIG. 4e to reach zero volt and diode D2 of FIG. 2 to conduct, in the center raster scanning example, just after time $t_3$ of FIG. 4e. In contrast, in the top or bottom scanning example, voltage $V_3$ reaches zero volts thus causing diode D2 of FIG. 2 to be forward biased at a later time, $t_4$, of FIG. 4e. The discharge current through capacitor CR1 of FIG. 2, which is equal to at least current $i_3$ and is greater than current $i_5$, causes that diode D2 starts conducting earlier than diode D1. When diode D2 conducts, only capacitor CR1 appears as the retrace capacitor. Since capacitors CR1 and CR2 are series coupled, the earlier conduction time of diode D2 in the center raster scanning example causes that the total retrace capacitance is larger than in the top or bottom scanning example. As explained before, the earlier closing of switch 40, in the center raster scanning example, causes a reduction of the effective retrace inductance. It follows that, for example, a decrease in retrace inductance is compensated by a corresponding increase in retrace capacitance. In general, the lower voltage $V_2$ and current $i_4$ of FIG. 2 are, the lower is the influence of inductor $L_M$ on the retrace inductance, resulting in a lower total retrace inductance, and the lower is that of capacitor CR2 on the retrace capacitance, resulting in a higher total retrace capacitance. Thus, in accordance with an aspect of the invention, in deflection system 22 of FIG. 2, the retrace resonance frequency and the retrace interval are relatively independent of east-west modulation.

In deflection system 22 of FIG. 2 the series connection of retrace capacitors CR1 and CR2 is equal to the total retrace capacitance that is required for the series connection of deflection winding $L_H$ and inductor $L_M$. Inductor $L_M$ is selected to obtain the required correction range of the east-west modulation and of the scanning width adjustment. Thus, the ratio between the minimum picture width and the maximum picture width is made, illustratively, equal to the ratio between the inductance of deflection winding $L_H$ and the sum of the inductance of inductor $L_M$ and that of deflection winding $L_H$.

The retrace voltage across capacitor CR2 is switched directly by transistor switch Q2; whereas in some prior art diode modulator circuits, that include a bridge configuration, the corresponding retrace voltage is loaded by a vertical rate parabolic current which is coupled via a relatively large choke impedance. In the inventive arrangement of FIG. 2, the vertical rate correction is accomplished via the switching operation of transistor Q2 during horizontal retrace in its direct connection to the bridge. Thus, the use of a large choke impedance is avoided, and bridge inductor $L_M$ of FIG. 2 may be of a lower value than the corresponding bridge inductor of a diode modulator to obtain the same east-west and width control range. That inductor $L_M$ may be smaller is particularly important in applications in which the horizontal frequency is higher than the standard $f_H$ frequency, for example, $2 \times f_H$ applications, because a smaller inductor produces substantially less power dissipation in the deflection circuit.

Figure 8:
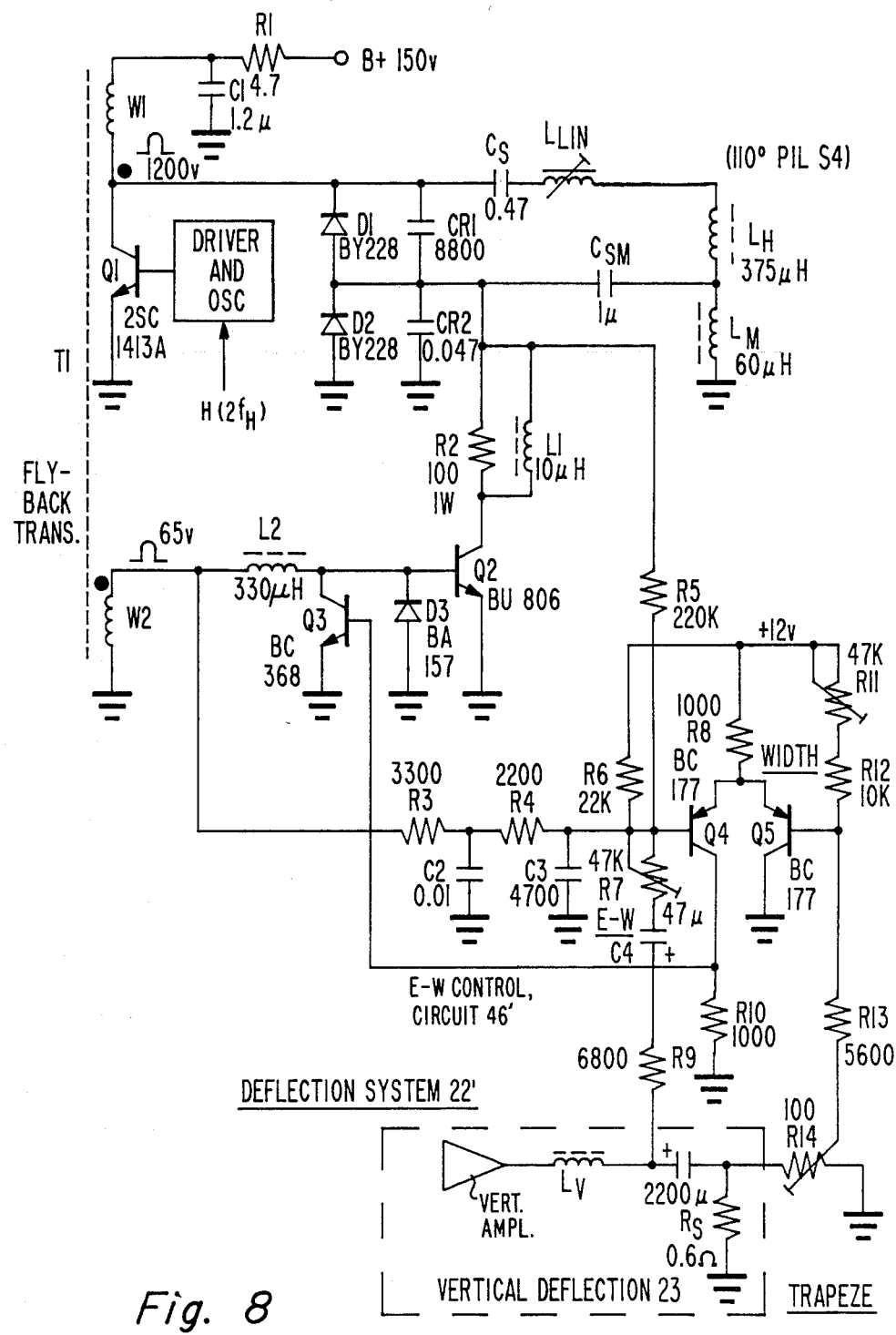
FIG. 8 is a diagram of a pincushion correction deflection circuit according to the invention that may be used for higher frequency horizontal scanning application.

FIG. 8 illustrates a pincushion corrected horizontal deflection system 22' that operates at a horizontal frequency $2f_H$, that is twice the horizontal frequency $f_H$ of system 22 of FIG. 2. Identical numbers and symbols in FIGS. 2 and 8 indicate similar items or functions. Deflection winding $L_H$ in FIG. 8 is a plurality of parallel coupled coils not individually illustrated; whereas it is a plurality of series coupled coils in FIG. 2.

Figure 9:
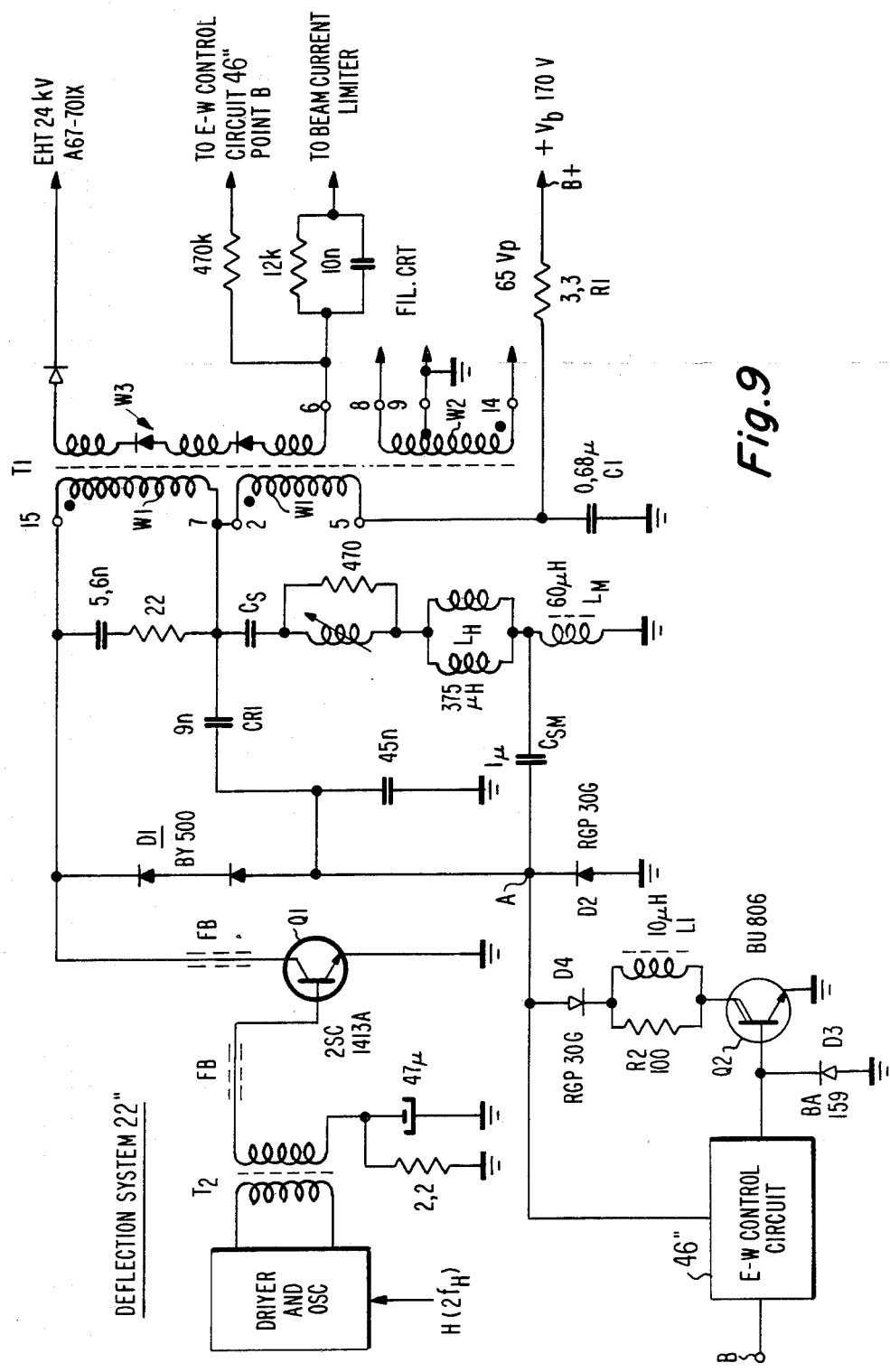
FIG. 9 is a diagram of another pincushion correction deflection circuit according to the invention that may be used for higher frequency horizontal scanning application.
Figure 10:
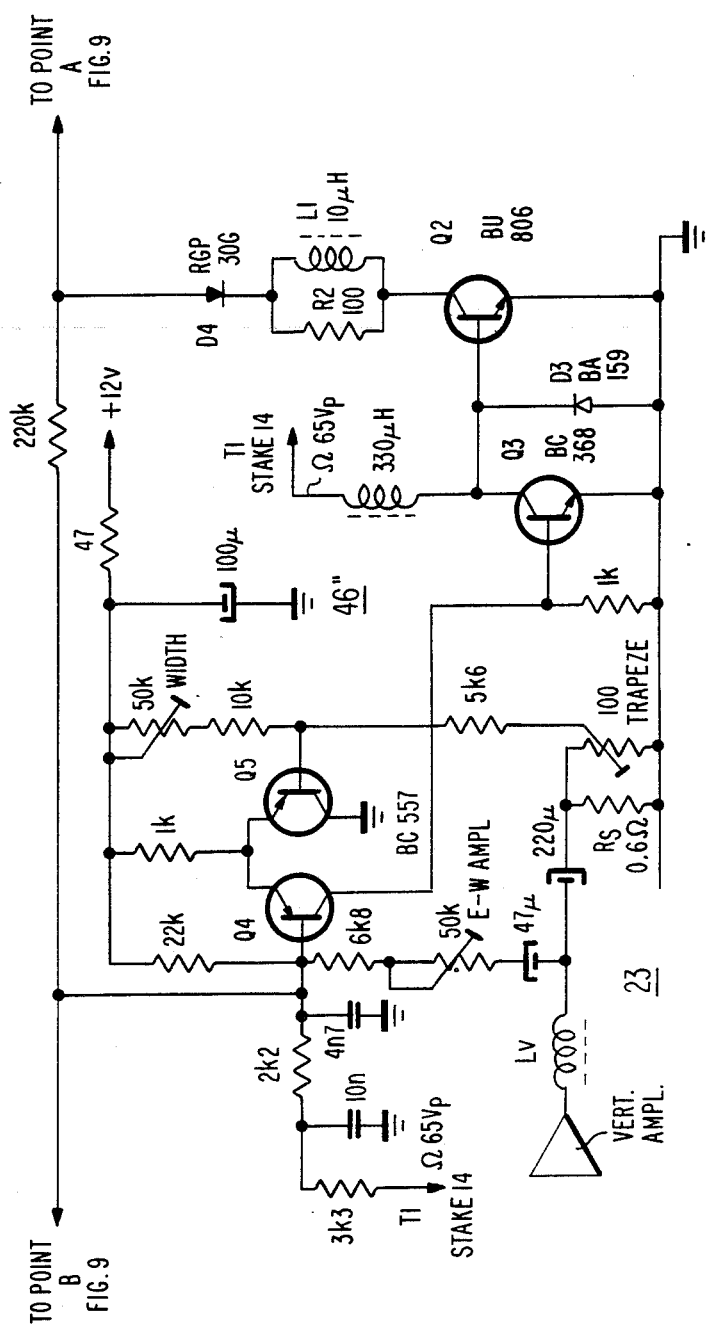
FIG. 10 illustrates a portion of the circuit of FIG. 9 that includes a detailed embodiment of an East-West control circuit.

FIG. 9 illustrates a pincushion corrected horizontal deflection system 22'' similar to horizontal deflection system 22' of FIG. 8 and operating at the $2f_H$ horizontal scanning frequency. FIG. 10 illustrates a detailed embodiment of an east-west control circuit 46'' that provides the switching signals for transistor Q2 of FIG. 9. Items in FIGS. 8-10 similarly identified, function in a similar manner or represent similar quantities.

Horizontal deflection system 22'' is modified from that of FIG. 8 to advantageously reduce the collector current flowing in horizontal output transistor Q1 at the end of horizontal trace. To this end, the bridge branch of deflection winding $L_H$ is coupled to horizontal output transistor Q1 via flyback transformer T1.

As illustrated in FIG. 9, primary winding W1 of flyback transformer comprises two winding sections connected together at a tap terminal that is the juncture of stakes 7 and 2 of the respective winding sections. The bridge branch of retrace capacitor CR1 is coupled to the bridge branch of deflection winding $L_H$ at tap terminal stakes 7 and 2.

During horizontal trace, the horizontal deflection current is stepped down in value by the upper winding section of primary winding W1 as it flows to horizontal output transistor Q1. Correspondingly, during horizontal retrace, the retrace pulse voltage developed across the lower winding section is stepped up in value at stake 15 of flyback transformer T1 to apply a greater retrace pulse voltage to horizontal output transistor Q1.

The step down in current and the step up in retrace pulse voltage provided by the transformer coupling arrangement of FIG. 9 is designed to reduce switching and operating stresses to horizontal output transistor Q1, especially when the transistor is operated at the greater $2f_H$ rate. Other horizontal output transistor devices may require the opposite condition-that of stepping down the horizontal retrace pulse voltage before it is applied to the device. It is then a simple matter to modify the connections between horizontal output transistor Q1, the winding sections of primary winding W1 and the bridge branches of deflection winding $L_H$ and retrace capacitor CR1 so as to provide a step down in retrace pulse voltage and a step up in current. In addition, if it is so desired, the autotransformer arrangement of the winding sections of winding W1 may be replaced by an arrangement using two separate windings.

Other differences to note in the circuitry of FIGS. 9 and 10 from the circuitry of FIG. 8 is the addition, in FIGS. 9 and 10, of a blocking diode D4 in the collector current path of switching transistor Q2. Also in FIGS. 9 and 10, the beam current input to control circuit 46'' is taken from stake 6 of flyback transformer high voltage tertiary winding W3. The voltage at stake 6 varies with beam current changes. This voltage is then coupled to the base of differential transistor Q4 of FIG. 10 and is coupled to point A of FIG. 9 via a relatively high valued resistor.

What is claimed is:

1. A deflection apparatus that includes a raster distortion correction circuit, comprising:
    a deflection winding;
    means coupled to said deflection winding for developing a trace voltage;
    first switching means for applying said trace voltage to said deflection winding to generate a trace current of a deflection current in said deflection winding during a trace interval, and for developing at a terminal thereof a retrace interval defining retrace voltage;
    an impedance coupled to said deflection winding to form first and second current paths of said deflection current in first and second branches of said impedance, respectively;
    a source of modulation rate voltage;
    second switching means coupled to said first current path for developing in accordance with said modulation rate voltage a raster distortion correction first voltage that is combined with said trace voltage to control said trace current during the trace interval, said second switching means reducing the impedance in said first current path during a portion of the retrace interval that varies in accordance with said modulation rate voltage to a lower value relative to the higher value of said impedance in said first current path that is maintained higher by said second switching means from the beginning of the retrace interval and until the beginning time of said portion;
    a first retrace capacitance coupled to said terminal of said first switching means for developing across said first retrace capacitance a first portion of said retrace voltage; and
    third means responsive to the current in said first current path of said impedance for controlling in accordance therewith the amplitude of said first portion of said retrace voltage relative to that of said retrace voltage, wherein said first portion of said retrace voltage is coupled to said deflection winding during the retrace interval for generating in accordance therewith a retrace scanning current in said deflection winding.

2. A deflection apparatus according to claim 1, wherein said first branch of said impedance comprises a modulation capacitance for developing said first voltage thereacross.

3. A deflection apparatus according to claim 2 wherein said second branch of said impedance comprises a modulation inductance.

4. A deflection apparatus according to claim 3 wherein said modulation inductance and capacitance form a first resonance circuit during the trace interval.

5. A deflection apparatus according to claim 1, wherein said third means comprises a second retrace capacitor that is coupled to said terminal of said first switching means via said first retrace capacitance, wherein a second portion of said retrace voltage is developed across said second retrace capacitance such that the sum said first and second portions of said retrace voltage comprises said retrace voltage and wherein a junction between the respective plates of said first and second retrace capacitances is coupled to receive current from said first current path in accordance with the operation of said second switching means.

6. A deflection apparatus according to claim 5, wherein said second switching means provides a low impedance across said second retrace capacitance when said second switching means is conductive.

7. A deflection apparatus according to claim 1, wherein, said third means comprises a second retrace capacitor for developing a second portion of said retrace voltage that varies in amplitude in accordance with said modulation rate voltage inversely to the variations in amplitude of said first portion of said retrace voltage.

8. A deflection apparatus according to claim 1 wherein said first switching means includes a horizontal output device and wherein said deflection winding is transformer coupled to said output device via a transformer winding.

9. A pincushion correction circuit, comprising:
a deflection winding;
a trace capacitance coupled to said deflection winding for developing a trace voltage;
first switching means for applying said trace voltage to said deflection winding to generate a trace current of a deflection current in said deflection winding during a trace interval, and for developing a retrace interval defining retrace voltage that generates a retrace current of said deflection current;
a modulation capacitance coupled to form therethrough a first current path of said deflection current;
a modulation inductance coupled to form therethrough a second current path of said deflection current;
a source of pincushion distortion correcting modulation rate deflection voltage;
second switching means coupled to said modulation capacitance and responsive to said modulation rate voltage for modulating said deflection current, said second switching means being in a nonconductive state from the beginning of the retrace interval and until switching to a conductive state at an instant within each retrace interval which is progressively advanced or retarded in accordance with said modulation rate voltage in a manner to reduce pincushion distortion; and
first and second retrace capacitances for developing said retrace voltage, wherein said second switching means is coupled across the plates of said second retrace capacitance to provide that within the retrace interval a high impedance appears thereacross when said second switching means is in said nonconductive state and to provide that within the retrace interval a low impedance appears thereacross when said second switching means is in said conductive state.

10. A pincushion correction circuit according to claim 9 wherein the voltage across said second retrace capacitance is responsive to said retrace voltage within the retrace interval outside the period in which said second switching means is conductive.

11. A deflection apparatus that includes a raster distortion correction circuit, comprising:
a deflection winding;
first switching means for generating a trace current of a deflection current in said deflection winding during a trace interval;
a first retrace capacitance coupled to said deflection winding;
a second retrace capacitance;
a modulation inductance coupled to said deflection winding and to said second retrace capacitance in such a way that said modulation inductance, deflection winding, first and second retrace capacitances form a bridge circuit, said bridge circuit having first and second bridge branches that form a first bridge resonant circuit and having third and fourth bridge branches that form a second bridge resonant circuit that has a resonance frequency that is substantially equal to that of said first bridge resonant circuit;
a source of raster distortion correcting modulation rate voltage; and
second switching means responsive to said modulation rate voltage for substantially forming, during a first portion of the retrace interval having a duration that varies in accordance with said modulation rate voltage, a short circuit across said first bridge resonant circuit.

12. A deflection apparatus according to claim 11 wherein operation of said first switching means generates a retrace voltage across said first and second retrace capacitance such that a first portion of said retrace voltage is developed across said first retrace capacitance and a second portion of said retrace voltage is developed across said second retrace capacitance and the sum of the voltages across said first and second retrace capacitances comprises said retrace voltage.

13. A deflection apparatus according to claim 11 wherein said modulation inductance and second retrace capacitance are included in said first and second bridge branches, respectively, and wherein said deflection winding and first retrace capacitance are included in said third and fourth bridge branches, respectively.

14. A deflection apparatus according to claim 13 wherein said first switching means includes a horizontal output device and wherein said third and fourth bridge branches are coupled to a first flyback transformer winding and said output device is coupled to a second flyback transformer winding.

15. A deflection apparatus according to claim 13 further comprising a modulation capacitance, wherein an end terminal of said first bridge branch is coupled to an end terminal of said second bridge branch and wherein said modulation capacitance is coupled between the respective other end terminals of said first and second bridge branches.

16. A deflection apparatus according to claim 11 wherein said second switching means is coupled to said terminal of said bridge circuit through an inductor that is of low impedance in the retrace frequency, to provide current limiting when said second switching means is conductive.

17. A deflection apparatus according to claim 11 including a flyback transformer having a winding coupled to said first switching means and to a source of energy for transferring energy from said source to said deflection winding during said retrace interval.

* * * * *

Disclaimer 4,565,949.—*Peter Eduard Haferl*, Adliswil, Switzerland. TELEVISION RASTER DISTORTION CORRECTION CIRCUIT. Patent dated Jan. 21, 1986. Disclaimer filed Feb. 18, 1986, by the assignee, *RCA Corp.*

Hereby enters this disclaimer to all claims of said patent.
[*Official Gazette April 8, 1986.*]